(12) United States Patent
Merkel (10) Patent No.: US 8,007,557 B2
(45) Date of Patent: Aug. 30, 2011

(54) HIGH-STRENGTH LOW-MICROCRACKED CERAMIC HONEYCOMBS AND METHODS THEREFOR

(75) Inventor: Gregory Albert Merkel, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/618,016

(22) Filed: Nov. 13, 2009

(65) Prior Publication Data

US 2010/0126132 A1    May 27, 2010

Related U.S. Application Data

(60) Provisional application No. 61/118,272, filed on Nov. 26, 2008, provisional application No. 61/139,863, filed on Dec. 22, 2008.

(51) Int. Cl.
*B01D 39/06* (2006.01)
(52) U.S. Cl. ........... 55/523; 55/323; 55/522; 55/524; 55/282.3; 55/385.3; 55/482; 55/483; 55/484; 55/DIG. 5; 55/DIG. 10; 55/DIG. 30; 60/297; 60/299; 60/301; 60/311; 422/180; 423/327.2
(58) Field of Classification Search .......... 55/323, 55/DIG. 30, 522, 524, 282.3, 385.3, 482–484, 55/DIG. 5, DIG. 10; 60/311, 297, 299, 301; 422/180; 423/327.2
See application file for complete search history.

(56) References Cited

U.S. PATENT DOCUMENTS

| | | | |
|---|---|---|---|
| 5,183,608 A | 2/1993 | Guile | |
| 5,258,150 A | 11/1993 | Merkel et al. | |
| 5,545,243 A | 8/1996 | Kotani et al. | |
| 6,864,198 B2 | 3/2005 | Merkel | |
| 6,942,713 B2 * | 9/2005 | Ogunwumi et al. | 55/523 |
| 6,984,253 B2 * | 1/2006 | Ichikawa et al. | 55/484 |
| 7,112,233 B2 * | 9/2006 | Ohno et al. | 55/523 |
| 7,138,002 B2 * | 11/2006 | Hamanaka et al. | 55/523 |
| 7,138,003 B2 * | 11/2006 | Ichikawa et al. | 55/523 |
| 7,141,089 B2 | 11/2006 | Beall et al. | |
| 7,179,316 B2 | 2/2007 | Merkel et al. | |
| 7,250,384 B2 | 7/2007 | Morimoto et al. | |
| 7,309,371 B2 | 12/2007 | Merkel et al. | |
| 7,572,311 B2 * | 8/2009 | Zuberi | 55/523 |
| 7,575,618 B2 * | 8/2009 | Miao et al. | 55/523 |
| 7,575,794 B2 * | 8/2009 | Faber et al. | 428/116 |
| 7,618,699 B2 * | 11/2009 | Beall et al. | 428/116 |

(Continued)

FOREIGN PATENT DOCUMENTS

EP    1 184 066    5/2004

(Continued)

*Primary Examiner* — Jason M Greene
*Assistant Examiner* — Dung Bui
(74) *Attorney, Agent, or Firm* — Joseph M. Homa (57) ABSTRACT

A low-microcracked porous cordierite honeycomb ceramic particulate filter having a high strength in combination with a very low pressure drop, a very high filtration efficiency, and a high thermal shock resistance. Little or no microcracking, a fine median pore diameter, and a narrow pore size distribution contribute to high strength. A thin channel wall, high wall permeability, and narrow pore size distribution, contribute to low pressure drop. A fine pore diameter and narrow pore size distribution with a minimum of coarse pores contribute to high filtration efficiency. A high strain tolerance, MOR/E, contributes to high thermal shock resistance. Particulate filters disclosed herein can be useful as a hot gas particulate filter, and particularly as an internal combustion engine exhaust gas particulate filter, such as an exhaust gas filter for a gasoline direct injection engine.

20 Claims, 4 Drawing Sheets

U.S. PATENT DOCUMENTS

| | | | |
|---|---|---|---|
| 7,648,548 B2 * | 1/2010 | Miao et al. | 55/523 |
| 7,704,296 B2 * | 4/2010 | Merkel | 55/523 |
| 2003/0024219 A1 | 2/2003 | Harada et al. | |
| 2004/0045267 A1 * | 3/2004 | Ichikawa et al. | 55/523 |
| 2005/0011174 A1 * | 1/2005 | Hong et al. | 55/523 |
| 2005/0091952 A1 * | 5/2005 | Ogunwumi et al. | 55/523 |
| 2005/0147791 A1 * | 7/2005 | Gulati et al. | 428/116 |
| 2007/0045909 A1 | 3/2007 | Watanabe et al. | |
| 2007/0119133 A1 * | 5/2007 | Beall et al. | 55/523 |
| 2007/0119134 A1 * | 5/2007 | Beall et al. | 55/523 |
| 2007/0234693 A1 * | 10/2007 | Miao et al. | 55/523 |
| 2007/0234694 A1 | 10/2007 | Miyairi et al. | |
| 2008/0004171 A1 * | 1/2008 | Melscoet-Chauvel et al. | 501/119 |
| 2008/0032090 A1 * | 2/2008 | Beall et al. | 428/116 |
| 2008/0032091 A1 * | 2/2008 | Beall et al. | 428/116 |
| 2008/0047243 A1 * | 2/2008 | Beall et al. | 55/523 |
| 2008/0057267 A1 * | 3/2008 | Brocheton et al. | 428/116 |
| 2008/0057269 A1 * | 3/2008 | Faber et al. | 428/116 |
| 2008/0063833 A1 | 3/2008 | Beall et al. | |
| 2008/0120950 A1 * | 5/2008 | Ohno et al. | 55/385.3 |
| 2009/0113863 A1 * | 5/2009 | Lu et al. | 55/523 |
| 2009/0137382 A1 * | 5/2009 | Merkel | 502/60 |
| 2009/0220733 A1 * | 9/2009 | Backhaus-Ricoult et al. | 428/116 |

FOREIGN PATENT DOCUMENTS

| | | |
|---|---|---|
| EP | 1 666 436 | 7/2006 |

* cited by examiner

HIGH-STRENGTH LOW-MICROCRACKED CERAMIC HONEYCOMBS AND METHODS THEREFOR

CROSS REFERENCE TO RELATED APPLICATION

This application claims the benefit of priority to U.S. Provisional Application No. 61/118,272, filed on Nov. 26, 2008 and to U.S. Provisional Application No. 61/139,863, filed on Dec. 22, 2008.

FIELD

The disclosure relates generally to porous honeycomb ceramics and methods of making, and more particularly to porous cordierite honeycomb ceramics useful in catalytic converters and particulate filters, such as for engine exhaust after-treatment.

BACKGROUND

Gasoline direct injection (GDI) engines for automotive and medium-duty applications offer greater power output and higher fuel economy compared to conventional multi-port fuel injection engines. However, GDI engines would produce carbon soot as a component of their exhaust emissions. Although the mass of soot is generally lower than that produced by diesel engines, the particle size of the soot in GDI engine exhaust would be much finer. Because a given mass of fine particles contains many more particles than the same mass of coarse particles, it is likely that an exhaust after-treatment filtration device will be desired for vehicles that are powered by GDI engines.

SUMMARY

Disclosed herein in one aspect is a ceramic wall-flow particulate filter providing improved filtration efficiency and low pressure drop along with high strength and high thermal shock resistance.

Disclosed herein in another aspect is a low-microcracked (i.e. substantially non-microcracked, including completely non-microcracked) porous cordierite honeycomb ceramic particulate filter having a high strength in combination with a very low pressure drop, a very high filtration efficiency, and a high thermal shock resistance. Little or no microcracking, a fine median pore diameter, and a narrow pore size distribution contribute to high strength. A thin channel wall, high wall permeability, and narrow pore size distribution, contribute to low pressure drop. A fine pore diameter and narrow pore size distribution with a minimum of coarse pores contribute to high filtration efficiency. A very high strain tolerance, MOR/E, contributes to high thermal shock resistance. Particulate filters disclosed herein can be useful as a hot gas particulate filter, and particularly as an internal combustion engine exhaust gas particulate filter, such as an exhaust gas filter for a gasoline direct injection engine. The filter optionally may possess a catalyst on or within the channel walls to assist in the combustion of soot and/or the conversion of hydrocarbons, CO, and NOx into $CO_2$, $H_2O$, and $N_2$.

In various embodiments, the ceramic bodies disclosed herein can provide a much higher material (wall) strength for a given percent porosity and median pore size (as compared to known ceramic bodies), and in the form of low-microcracked cordierite filters provide smaller pore size for high filtration efficiency and a thinner wall for lower pressure drop, while also providing a high thermal shock resistance due to a high ratio of MOR to elastic modulus.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Reference will now be made in detail to embodiments of the invention, examples of which are illustrated in the accompanying drawings. Whenever possible, the same reference numerals will be used throughout the drawings to refer to the same or like parts.

In accordance with the invention, the present disclosure provides a porous cordierite ceramic wall-flow honeycomb filter exhibiting high strength, low pressure drop, high filtration efficiency, and high thermal shock resistance. The filter can be especially suitable for use as soot filter for the exhaust gas of a gasoline direct injection engine.

In one set of embodiments, the filter disclosed herein exhibits: (a) a cell density, N, a wall thickness, w, a total pore volume fraction, p, and a median pore diameter, $d_{50}$, which satisfy the relationship $P_c \leq 4.0$, where $P_c$ is defined as $P_c = 0.156(w) + 0.00632(N) + 2.429(w)/[(d_{50}^2)(p)]$, and where cell density is in units of cells (channels) per square inch, wall thickness is in units of $10^{-3}$ inches (mils), total pore volume fraction is the total % porosity/100 and is dimensionless, $d_{50}$ is in units of microns, and $d_{50}$ and % porosity are as measured by mercury porosimetry; (b) a median pore diameter $d_{50} \leq 14$ μm and a second pore diameter $d_{90} \leq 20$ μm, where the terms $d_{50}$ and $d_{90}$ denote the pore diameters, in microns, or micrometers ($10^{-6}$ meters), at which 50% and 90% of the total pore volume are of a finer pore diameter, for example, $d_{90}$ is the pore diameter at which 90% (by volume) of the pores are of a smaller diameter (equal to the pore diameter at which the cumulative mercury intrusion volume equals 10% of the total mercury intrusion volume), and therefore $d_{50} < d_{90}$; room-temperature four-point modulus of rupture on an axial specimen of the honeycomb of at least 200 psi and a ratio of MOR/CFA of at least 1100 psi, where CFA is the closed frontal area fraction of the face of the honeycomb substrate, defined as $CFA = (w/1000)[2(N^{-0.5}) - (w/1000)](N)$; (c) an elastic modulus ratio, E(900)/E(25), of not more than 0.97, where the value of E(900) is the elastic modulus at 900° C. as measured upon heating, and the value of E(25) is the elastic modulus as measured near room temperature prior to heating, both as measured on a bar parallel to the axial direction of the honeycomb using a sonic resonance technique; and (d) a thermal shock limit, TSL(200)>800° C., defined as TSL(200) = 200+(MOR/E)/[CTE(200-1000)] where MOR and E are as measured at room temperature and CTE(200-1000) is the mean coefficient of thermal expansion from 200 to 1000° C. as measured by dilatometry along the axial direction of the honeycomb. In some of these embodiments, $P_c \leq 3.6$, and in other embodiments $P_c \leq 3.4$.

It was found that when the cell geometry, % porosity, and median pore diameter of the filter are such as to satisfy $P_c \leq 3.4$, the filter can have an especially low pressure drop in the clean state or under conditions of low soot-loading, such as a pressure drop equal to or even lower than the pressure drop of a conventional flow-through catalytic converter substrate having, for example, a cell geometry of 900/2 and with the same external dimensions as the filter and measured under conditions of equivalent exhaust gas flow rates and temperatures. The value of $P_c$ is lowest for thin walls, high permeability, and low cell density. In some embodiments, the value of $P_c$ is not more than 3.2, in other embodiments not more than 2.8, in other embodiments not more than 3.0, in other embodiments not more than 2.6, and in some embodiments not more than 2.4, to further reduce pressure drop.

The cell density, N, is preferably not more than 400, more preferably not more than 350, even more preferably not more than 300, still more preferably not more than 250, yet more preferably not more than 200, and in some embodiments N is not more than 150 cells/in². In some embodiments N is at least 80 cells/in².

The wall thickness, in mils ($10^{-3}$ inch), is preferably not more than 15.0-0.026(N), and more preferably is not more than 13.0-0.022(N), 11.0-0.0176(N), 10.0-0.0155(N), and even more preferably is not more than 9.0-0.0133 (N); in some embodiments, N is at least 8.0-0.0111(N).

The closed frontal area fraction, CFA, is preferably not more than 0.26, more preferably not more than 0.24, even more preferably not more than 0.22, still more preferably not more than 0.20, and even still more preferably not more than 0.18, and even more preferably not more than 0.16; in some embodiments, CFA is at least 0.14.

In some embodiments, the % porosity is $\geq 52\%$, in other embodiments at least 54%, in other embodiments at least 56%, in other embodiments at least 58%, in other embodiments at least 60%, in other embodiments at least 62%, and in other embodiments at least 64%. Higher porosity contributes to a lower pressure drop, higher MOR/E ratio, and higher thermal shock resistance. High porosity is also advantageous for applications in which the filter contains a catalyst residing within the pores of the filter wall so that low pressure drop is maintained. High strength can be maintained despite the high porosity due to the low degree of microcracking in the cordierite ceramic body. In other embodiments having an increased emphasis on greater strength, the porosity is preferably $\geq 52\%$ but is preferably $\leq 60$, in some embodiments $\leq 58$, and in other embodiments $\leq 56\%$.

The median pore diameter, $d_{50}$, is preferably at least 7 μm, and in some embodiments at least 8 μm, and in other embodiments at least 9 μm, to minimize the pressure drop. The median pore diameter is also preferably not more than 13 μm, and in some embodiments not more than 12 μm, and in other embodiments not more than 11 μm, to maintain high filtration efficiency and high MOR. The value of the $d_{90}$ pore diameter is preferably not more than 18 μm, in some embodiments not more than 17 μm, in other embodiments not more than 16 μm, in other embodiments not more than 15 μm, in still other embodiments not more than 14 μm, and in some embodiments not more than 13 μm, also to provide high filtration efficiency.

To aid in providing a high permeability and low pressure drop, the quantity $(d_{50})^2$(% porosity/100) is preferably at least 30 μm², and more preferably at least 40 μm², and in some embodiments at least 50 μm², and in other 60 μm², and in other embodiments at least 70 μm², and in still other embodiments at least 80 μm², and in still other embodiments at least 90 μm², as higher values for this parameter correlate with higher permeability and lower pressure drop.

Preferably, the value of $d_f$, defined as $(d_{50}-d_{10})/d_{50}$, is not more than 0.45, and more preferably is not more than 0.40, and in some embodiments is not more than 0.35, and in other embodiments is not more than 0.30. A low value of $d_f$ minimizes the rate at which pressure drop increases with the accumulation of soot or ash. The value of $d_b$, defined as $(d_{90}-d_{10})/d_{50}$, is preferably not more than 1.40, and more preferably is not more than 1.20, and in some embodiments is not more than 1.00, and in other embodiments is not more than 0.90, and in still other embodiments is not more than 0.80, and in some embodiments is not more than 0.70. A low value of $d_b$ and/or a low value of $d_f$ corresponds to a narrow pore size distribution, which is beneficial for strength, filtration efficiency, and MOR/E.

To further aid in providing a high MOR/E, the value of the "pore connectivity factor" $PCF_b = \%$ porosity/$d_b$ is preferably at least 45, in some embodiments at least 60, in other embodiments at least 70, in other embodiments at least 80, and in still other embodiments at least 90. Also to further aid in providing a high MOR/E, the value of the "pore connectivity factor" $PCF_f = \%$ porosity/$d_f$ is preferably at least 140, in some embodiments at least 150, in other embodiments at least 170, in other embodiments at least 190, and in still other embodiments at least 200.

Preferably the value of MOR/CFA is at least 1150 psi, more preferably at least 1200 psi, even more preferably at least 1300 psi, still more preferably at least 1400 psi, yet still more preferably at least 1500 psi, and in some embodiments at least 1600 psi, and in other embodiments at least 1700 psi, and in still other embodiments at least 2000 psi, and in other embodiments at least 2500 psi, and in other embodiments at least 3000 psi, and in other embodiments at least 3500 psi. High values of MOR/CFA helps to provide adequate strength to the filter, which is especially important for the thin walls and low cell densities desired to achieved low pressure drop.

In some embodiments, the cordierite particulate filter disclosed herein exhibits an elastic modulus (E) ratio, E(900)/E (25), of not more than 0.96, and in other embodiments not more than 0.95, and in still other embodiments not more than 0.94, and in yet other embodiments not more than 0.93, and in other embodiments not more than even 0.92, as it has been discovered that a lower ratio of E(900)/E(25) corresponds to a lower degree of microcracking, a greater strength, a greater strain tolerance (MOR/E), and a higher predicted thermal shock resistance.

Preferably the value of the microcrack index, $Nb^3$, is not more than 0.04, and more preferably not more than 0.03, and in some embodiments not more than 0.02, and in other embodiments not more than 0.01. The microcrack index is derived from the room-temperature and high-temperature elastic modulus measurements as described in United States Patent Application Number 2008/0032091(A1).

In some embodiments, the ratio of the modulus of rupture, MOR(25), and room-temperature elastic modulus, E(25), referred to as the strain tolerance and designated as MOR/E, is at least 0.120%, and in other embodiments is at least 0.130%, and in other embodiments is at least 0.140%, and in other embodiments is at least 0.150%, and in other embodiments is at least 0.160%, and in other embodiments is at least 0.170%, and in other embodiments is at least 0.180%, and in other embodiments is at least 0.190%, and in other embodiments is at least 0.200%, and in other embodiments is at least 0.210%, and in other embodiments is at least 0.220%, where "%" signifies and is equivalent to "$\times 10^{-2}$."

The value of the computed thermal shock limit TSL(200) is at least 800° C., preferably more than 850° C., and is more preferably at least 900° C., even more preferably at least 950° C., still more preferably at least 1000° C., yet more preferably at least 1050° C., even more preferably at least 1100° C., still more preferably at least 1150° C., and in some embodiments at least 1200° C., and in other embodiments at least 1300° C. Preferably, the value of the computed thermal shock limit TSL(500), defined as $\{500+(MOR/E)/[CTE(500-900)]\}$, is at least 1000° C., and is more preferably at least 1050° C., and even more preferably at least 1100° C., and still more preferably at least 1200° C., and even more preferably at least 1300° C., and yet more preferably at least at least 1400° C., wherein MOR/E is defined as above and CTE(500-900) is the mean coefficient of thermal expansion during heating from 500° C. to 900° C. in the axial direction of the honeycomb.

The mean CTE from 25 to 800° C. of a honeycomb body disclosed herein as measured in the axial direction, in units of $10^{-7}$/° C., is preferably at least 13, and more preferably at least 14, and even more preferably at least 15, and in some embodiments at least 16, as higher values of CTE generally correspond to lower microcracking and higher strength.

As disclosed herein, a method is provided for making high strength low-microcracked ceramic bodies, and in particular cordierite bodies, such as cordierite honeycomb bodies. The method comprises the following: (a) providing an inorganic material mixture resulting from mixing together cordierite-forming raw materials, which include a magnesium-containing raw material, an aluminum-containing raw material, and a silicon-containing raw material, in ratios that are sufficient to form a predominantly cordierite ceramic body upon firing, wherein the inorganic material mixture also contains one or more of: (i) at least 15 weight % of a magnesium aluminate spinel powder (hereafter referred to as "spinel") having a median particle diameter of not more than 10 μm and at least 10 weight % of a kaolin powder; or (ii) at least 0.001 weight percent of a pre-reacted cordierite powder or magnesium aluminosilicate glass powder which is capable of crystallizing, at least in part, to cordierite at a temperature below 1150° C.; or (iii) sources of one or more metals selected from the group consisting of lithium, sodium, potassium, rubidium, cesium, calcium, strontium, barium, yttrium, a trivalent rare earth element such as lanthanum, and zinc, wherein the total concentration of said metals in the ceramic body is at least 0.5 percent by weight as the metal oxides; (b) blending the inorganic material mixture with one or more organic binders, lubricants, plasticizers, or pore-forming materials (any of which combust, evaporate, or are otherwise eliminated from the body during heating) or combinations thereof to result in a ceramic forming precursor batch mixture; (c) mixing the ceramic forming precursor batch mixture with a liquid vehicle such as water or other liquid medium to form a plasticized ceramic forming precursor batch mixture; (d) forming the mixture into a shaped body, such as a shaped body having a honeycomb structure. The method can further comprise: (e) drying the shaped body and (f) subsequently firing the shaped body in a furnace environment at a furnace temperature and for a sufficient time to react the materials in the batch mixture to form a porous cordierite ceramic. The method can further comprise (g) cooling the fired shaped body of porous cordierite ceramic to room temperature.

In one set of embodiments, the inorganic material mixture contains spinel powder, and the spinel powder in some embodiments comprises at least 17%, in other embodiments comprises at least 20%, and in other embodiments comprises at least 23%, by weight of the inorganic material mixture. Also, the spinel powder preferably has a median particle diameter of not more than 8 μm, and in some embodiments not more than 7 μm, in other embodiments not more than 6 μm, and in other embodiments not more than 5 μm. In this set of embodiments, the kaolin preferably comprises at least 12%, more preferably at least 14%, and even more preferably at least 16%, by weight of the inorganic material mixture.

In another set of embodiments, the inorganic material mixture contains pre-reacted cordierite powder or cordierite-forming magnesium aluminosilicate glass powder. The pre-reacted cordierite powder or cordierite-forming magnesium aluminosilicate glass powder has a median particle diameter of not more than 10 μm, and preferably not more than 8 μm, and in some embodiments not more than 6 μm, and in some embodiments not more than 5 μm, and in some embodiments not more than 3 μm, and in some embodiments not more than 1 μm. The amount of pre-reacted cordierite powder or cordierite-forming magnesium aluminosilicate glass powder is preferably at least 0.01%, more preferably at least 0.10%, and in some embodiments at least 1.0%, by weight of the inorganic material mixture, but is preferably not more than 10% by weight of the inorganic material mixture.

In another set of embodiments, the inorganic material mixture contains one or more metal sources that contain one or more of the elements calcium, strontium, zinc, yttrium, or a trivalent rare earth element such as lanthanum. The amount(s) of metal added to the raw material mixture, expressed as the metal oxide, is preferably at least 0.5 weight %, and more preferably at least 1.0 weight %, but preferably not more 5 weight % and more preferably not more than 3 weight %, by weight of the inorganic material mixture. The median particle diameter of the metal-containing additive is preferably not more than 10 μm, and more preferably not more than 5 μm, and even more preferably not more than 3 μm, and still more preferably not more than 1 μm. It has been determined that these metal oxides promote the formation of a glass phase which is beneficial in reducing microcracking and increasing strength, MOR/E, and thermal shock resistance.

As used herein in describing the cordierite-forming raw materials, the term "magnesium source" refers to any phase which includes the element magnesium as a necessary constituent of its chemical formula. Similarly, an "aluminum source" refers to any phase which includes the element aluminum as a necessary constituent of its chemical formula. A "silicon source" likewise refers to any phase which includes the element silicon as a necessary constituent of its chemical formula. The term "magnesium oxide forming source" shall mean a magnesium source which includes no other metal, except possibly as an impurity, and which, when heated to 1400° C. in the absence of other raw materials, would form only the phase magnesium oxide except for possible traces of other phases formed from any impurities. Similarly, the term "aluminum oxide forming source" shall mean an aluminum source which includes no other metal, except possibly as an impurity, and which, when heated to 1400° C. in the absence of other raw materials, would form only the phase aluminum oxide except for possible traces of other phases formed from any impurities. Likewise, the term "silica forming source" shall mean a silicon source which includes no other metal, except possibly as an impurity, and which, when heated to 1400° C. in the absence of other raw materials, would form only the phase silicon dioxide except for possible traces of other phases formed from any impurities. The term "cordierite forming raw materials" comprises all raw materials which are magnesium sources, aluminum sources, and silicon sources.

The magnesium source is selected from the group consisting of talc, calcined talc, chlorite, calcined chlorite, magnesium aluminate spinel, forsterite, enstatite, sapphirine, or a magnesium oxide forming source such as magnesium hydroxide, magnesium carbonate, or magnesium oxide itself. The aluminum source is selected from the group consisting of pyrophyllite, calcined pyrophyllite, kaolin, calcined kaolin, kyanite, sillimanite, andalusite, mullite, magnesium aluminate spinel, sapphirine, or an aluminum oxide forming source such as diaspore, boehmite, gibbsite, a transition alumina such as gamma-alumina, or alpha-alumina (corundum). The silicon source is selected from the group consisting of talc, chlorite, forsterite, enstatite, sapphirine, pyrophyllite, calcined pyrophyllite, kaolin, calcined kaolin, kyanite, sillimanite, andalusite, mullite, and silica forming sources such as fused silica, quartz, cristobalite, Tripoli silica, colloidal amorphous silica, diatomaceous silica, etc.

Preferably, each of the cordierite-forming raw materials has a median particle diameter of not more than 12 μm, and even more preferably not more than 10 μm. Also the weighted average of the median particle diameters of the cordierite-forming raw materials, $w_{av}$(CFRM), is preferably not more than 12 μm, even more preferably not more than 10 μm, and still more preferably not more than 8 μm, and further is preferably not less than 4.0 μm. The weighted average of the median particle diameters of two or more powders in a group, $w_{av}$, is computed as $w_{av} = \Sigma[(w_i)(D_{50,i})]/\Sigma(w_i)$, where "$\Sigma$" denotes the sum over all powders within the group (the group in this case being either the cordierite-forming raw materials or the pore-forming materials), "w," is the part by weight of each powder in the group, and "$D_{50,i}$" is the median particle diameter of each powder in the group, as measured by a laser diffraction technique.

Preferably, the median particle size of each pore former is not more than 40 μm, and more preferably is not more than 30 μm, and even more preferably is not more than 20 μm, and still more preferably is not more than 15 μm, and yet more preferably is not more than 10 μm. Also, the weighted average of the median particle diameters of the pore-forming materials, $w_{av}$(PF), is not preferably more than 35 μm, and more preferably is not more than 30 μm, even more preferably is not more than 20 μm, still more preferably is not more than 15 μm, and in some embodiments is even not more than 10 μm.

Unless otherwise noted herein, the particle diameters of all powders are measured by a laser diffraction technique, such as by a Microtrac particle size analyzer.

EXAMPLES

The present invention is illustrated by the following non-limiting examples.

Raw materials used to make the examples are provided in Table 1. The batch compositions for the examples are listed in Table 2. Tables 3 and 4 give the various relevant physical properties for the examples. Table 5 provides physical properties for eight comparative cordierite filter examples.

Raw materials, pore formers, and solid and liquid organic additives were weighed in the proportions given in Table 2, mixed with the indicated amounts of distilled water, and worked in a horizontal rotating-plow mixer to provide a plasticized mixture. The material was subsequently loaded into a twin-screw type extruder, de-aired using a vacuum system, and extruded through a die to form 2-inch diameter honeycomb product. Parts were cut to approximately 8-inch lengths and partially dried in a microwave dryer, followed by complete drying in a convection oven. The dried parts were cut to 6-inch lengths and fired vertically in an electric furnace. Heating rates from 750 to 1000° C. were either 20 or 75° C./hr, followed by 20° C./hr from 1000 to 1200° C., and 10° C./hr from 1200° C. to maximum temperature. Parts were held at a peak temperature of 1340 to 1400° C. for 20 hours. Specific firing conditions for each sample are indicated in Tables 3 and 4. Fired cell geometries are also provided in Tables 3 to 5.

Porosity was measured by mercury porosimetry, and pore volume, % porosity, and values of the pore diameters at 1, 2, 5, 10, 25, 50, 75, 90, 95, 98, and 99% of the pore size distribution, on a volumetric basis, are provided in the tables. Also computed from these parameters are $d_f = (d_{50} - d_{10})/d_{50}$, $d_c = (d_{90} - d_{50})/d_{50}$, $d_b = (d_{90} - d_{10})/d_{50}$, a "pore connectivity factor" $PCF_b = (\%\ porosity)/(d_b)$, a "pore connectivity factor" $PCF_f = (\%\ porosity)/(d_f)$, and $(d_{50})^2(\%\ porosity/100)$. High values of $PCF_b$ and $PCF_f$ can be beneficial for low pressure drop and high MOR/E.

The gas permeability across the thickness of the ceramic wall cut from the honeycomb body was measured for several examples using a capillary flow porometer from Porous Materials, Inc., and values in units of $\mu m^2$, equal to $10^{-12}$ $m^2$ or about 1.013 Darcys, are given in the tables.

Filtration efficiency was measured using propane generated carbon soot. Upstream soot concentrations were measured with an AVL 415S smoke meter, and downstream concentrations were determined by a photo acoustic method using an AVL μsootsensor. The flow rate was 250 liters/minute with an upstream soot concentration of 2.5 $mg/m^3$. Filtration efficiency was calculated as the percentage of trapped soot relative to the total soot produced. Results are reported at a soot particle size of 60 nm for the examples of the present disclosure and 113 nm for the comparative examples.

Pressure drops of examples A, B, B2, and C of the present disclosure as 2 inch×6 inch filters were measured as a function of flow rate and soot loading on a test bench using artificial carbon soot.

Unless otherwise noted herein, coefficients of thermal expansion (CTE) represent the mean CTE's between the indicated temperatures (° C.) and were measured by dilatometry.

As described in United States Patent Application Publication Number 2008/0032091 which is incorporated herein, transverse and axial I-ratios represent the degree of non-random cordierite crystal orientation in the fired ware. Weight percentages of mullite, spinel+sapphirine, and corundum in the fired ceramic (when present) were measured by x-ray diffractometry.

Modulus of rupture (MOR) was measured in the axial direction using the four-point beam bending method. The value of MOR/CFA was computed using the measured MOR and CFA was calculated from the cell geometry of the actual fired part.

Elastic modulus was measured in the axial direction using a sonic resonance technique. The microcrack index, $Nb^3$, was determined by the method described in United States Patent Application Publication Number 2008/0032091.

Examples A to J of the present disclosure exhibit values of $(d_{50})$(% porosity/100) 40 $\mu m^2$, MOR/CFA≧1200 psi, E(900)/E(25)≦0.95, 7.9≦$d_{50}$≦13.5 μm and 11.2≦$d_{90}$≦19.7 μm, TSL(200)≧812° C. and TSL(500)≧1033° C. Comparative examples exhibit values of MOR/CFA<1100 psi, values of E(900)/E(25)>0.97 or values of the microcrack index, $Nb^3$, greater than 0.04, and values of the $d_{90}$ pore size>20 μm. Furthermore, the filtration efficiencies of the three examples of the present disclosure for which they were measured all exceed those of the two known comparative examples, and meet the requirements for filtration of the fine particles in GDI engine exhaust.

Figure 1:
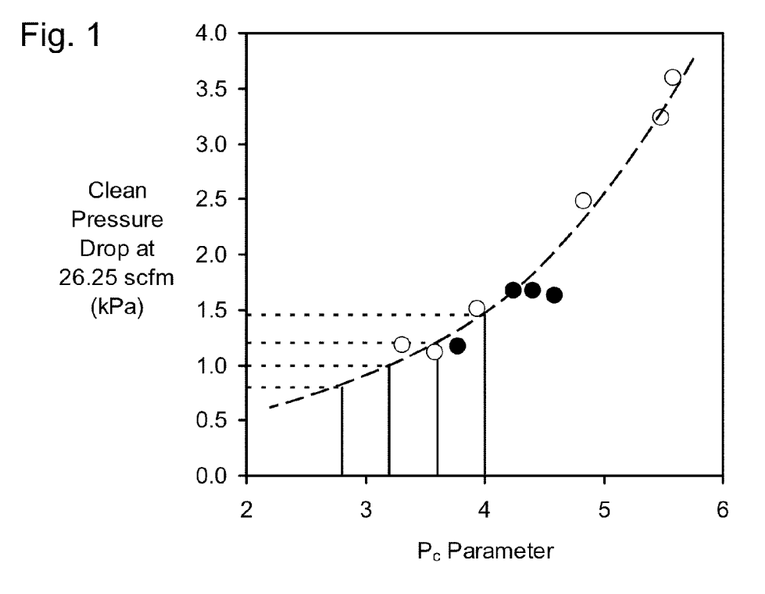
FIG. 1 is a graphic illustration depicting the clean pressure drop (kPa), as measured on 2-inch diameter, 6-inch long filters at room temperature and a flow rate of 26.25 standard cubic feet of air per minute, plotted against the Pc parameter.

FIG. 1 is a graphic illustration depicting the clean pressure drop (kPa), as measured on 2-inch diameter, 6-inch long filters at room temperature and a flow rate of 26.25 standard cubic feet of air per minute, plotted against the Pc parameter as defined in the present invention, for examples disclosed herein (filled circles) and comparative examples (open circles). Long-dashed curve defines the approximate change of clean pressure drop with the Pc parameter, and shows that low values of Pc are beneficial for achieving low clean pressure drop. Short-dashed horizontal lines indicate the approximate values of clean pressure drop corresponding to certain preferred upper limits for Pc shown by solid vertical lines.

Figure 2:
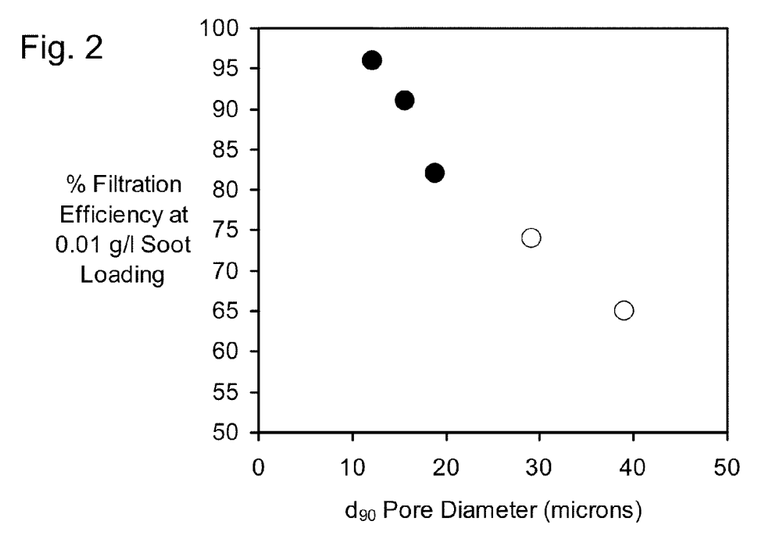
FIG. 2 is a graphic illustration showing the percent filtration efficiency of wall-flow filters at 0.01 g/l soot loading plotted against the d90 pore diameter of the filters.

FIG. 2 is a graphic illustration showing the percent filtration efficiency of wall-flow filters at 0.01 g/l soot loading plotted against the d90 pore diameter of the filters for examples disclosed herein (filled circles) and comparative examples (open circles). The data show the benefit of a d90≦20 μm in achieving a high filtration efficiency.

Figure 3:
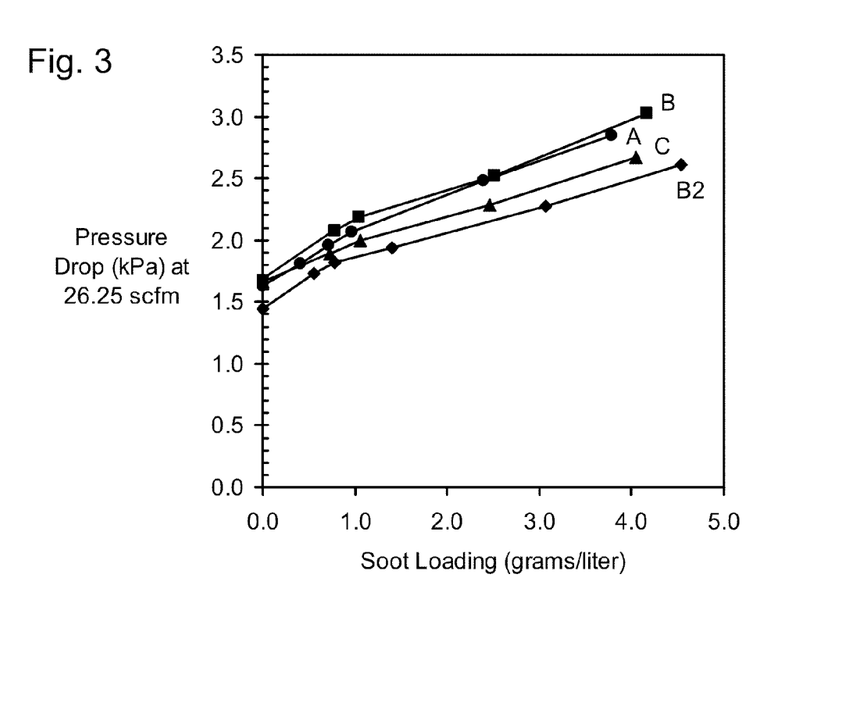
FIG. 3 is a graphic illustration showing the pressure drop versus soot loading for three filters disclosed herein having cell densities of approximately 370 cells/inch$^2$ and wall thicknesses of about 10.5 mils ($10^{-3}$ inches) and for one filter disclosed herein having a cell density of approximately 364 cells/inch$^2$ and a wall thickness of about 7.5 mils. The near linear increase in pressure drop with soot loading demonstrates that minimal soot is entering the wall of the filter and is the result of the well-interconnected porosity of these filters.

Results of soot-loaded pressure drop measurements for Examples A, B, B2, and C are shown in FIG. 3 for a flow rate of 26.25 scfm. FIG. 3 is a graphic illustration showing the pressure drop versus soot loading for three filters disclosed herein having cell densities of approximately 370 $cells/inch^2$ and wall thicknesses of about 10.5 mils ($10^{-3}$ inches) and for one filter disclosed herein having a cell density of approximately 364 $cells/inch^2$ and a wall thickness of about 7.5 mils. The near linear increase in pressure drop with soot loading demonstrates that minimal soot is entering the wall of the filter and is the result of the well-interconnected porosity of these filters. That is, the near linearity of the curves indicates minimal soot penetration of the walls, further indicating uniform and well-interconnected porosities in these examples.

Tables 3 and 4 include values of $P_c$ and MOR computed for the inventive examples at cell geometries of 200/8, 200/6, 300/6, and 400/4, in which 200, 300, and 400 are the cell densities (N) in units if $cells/inch^2$, and 8, 6, and 4 are the wall thicknesses (w) in units of mils ($10^{-3}$ inch). Values of $P_c$ were calculated from the relation $P_c=0.156(w)+0.00632(N)+2.429(w)/[(d_{50}^2)(p)]$ as defined previously, and MOR was calculated from the relation MOR=(MOR/CFA){(w/1000)[2($N^{-0.5}$)−(w/1000)](N)} where (MOR/CFA) is as tabulated for the example and N and w pertain to the respective values of 200 and 8, 200 and 6, 300 and 6, and 400 and 4. The computations show an exemplary range of cell geometries which exhibit advantageous properties.

Table 1 lists raw materials used in the examples.

TABLE 1

| Raw Material | Subsequent Processing | $D_{50}$ (microns) |
| --- | --- | --- |
| Talc A | — | 5.5 |
| Talc B | — | 10 |
| Talc C | −325 mesh | 23 |
| Mg Hydroxide | — | 0.8 |
| Spinel A | milled | 4.1 |
| Spinel B | milled | 7.4 |
| Mullite | milled | 6.0 |
| Kyanite A | milled | 8.9 |
| Kyanite B | −325 mesh | 12 |
| Kaolin | — | 10 |
| Alumina A | — | 6.3 |
| Alumina B | — | 6.8 |
| Boehmite | — | 0.12 |
| Quartz | — | 4.5 |
| Fused Silica | — | 11 |
| Yttrium Oxide | — | 0.8 |
| Attapulgite | — | 2.0 μm × 3 nm |
| Cordierite | milled | 4.4 |
| Graphite A | −280 mesh | 9.3 |
| Graphite B | — | 35 |
| Walnut Shell Flour | — | 29 |
| Rice Starch | — | 7.1 |
| Corn Starch | — | 15 |
| Methyl Cellulose | — | — |
| Hydrogenated Dimeric 1-Decene | — | — |
| Sodium Stearate | — | — |
| Tall Oil Fatty Acid | — | — |

Table 2 lists batch compositions, in parts by weight.

TABLE 2

| Example | A | B | C | D | E | F | G | H | I | J |
|---|---|---|---|---|---|---|---|---|---|---|
| Talc A | — | — | — | — | — | — | — | — | — | 42.38 |
| Talc B | 14.53 | 14.35 | — | 41.78 | 41.22 | 25.00 | 25.00 | 25.00 | — | — |
| Talc C | — | — | 14.35 | — | — | — | — | — | — | — |
| Mg Hydroxide | 12.00 | 12.00 | 12.00 | — | — | — | — | — | 18.77 | — |
| Spinel A | — | — | — | — | — | 23.47 | 23.47 | — | — | — |
| Spinel B | — | — | — | — | — | — | — | 23.47 | — | — |
| Mullite | — | — | — | 39.13 | — | — | — | — | — | — |
| Kyanite A | 58.24 | — | — | — | — | — | — | — | — | — |
| Kyanite B | — | — | — | — | 52.20 | — | — | — | — | — |
| Kaolin | — | 16.00 | 16.00 | — | — | 16.00 | 16.00 | 16.00 | — | — |
| Alumina A | — | 26.23 | 26.23 | — | — | 9.40 | 9.40 | 9.40 | — | — |
| Alumina B | — | — | — | — | — | — | — | — | 28.87 | 30.12 |
| Boehmite | — | — | — | 5.00 | 5.00 | — | — | — | 5.00 | 5.00 |
| Quartz | 15.22 | 31.42 | 31.42 | 14.09 | 1.58 | 26.12 | 26.12 | 26.12 | — | 23.50 |
| Fused Silica | — | — | — | — | — | — | — | — | 47.36 | — |
| Yttrium oxide | 1.00 | 1.00 | 1.00 | 1.00 | 1.00 | — | 1.00 | — | — | 1.00 |
| Attapulgite | — | — | — | — | — | — | — | — | 10.00 | — |
| Cordierite | — | — | — | — | — | — | — | — | 1.00 | — |
| Graphite A | 10.00 | 15.00 | — | — | — | — | — | — | — | — |
| Graphite B | — | — | 15.00 | 15.00 | 15.00 | 15.00 | 15.00 | — | 50.00 | 45.00 |
| Walnut Shell Flour | — | — | 30.00 | 40.00 | 40.00 | 40.00 | 40.00 | 40.00 | — | — |
| Rice Starch | 25.00 | 15.00 | — | — | — | — | — | — | — | — |
| Corn Starch | — | — | — | — | — | — | — | — | 10.00 | 15.00 |
| Methocel | 6.00 | 6.00 | 6.00 | 6.00 | 6.00 | 6.00 | 6.00 | 6.00 | 6.00 | 6.00 |
| Durasyn ® 162 | 4.60 | 4.60 | 4.60 | — | — | — | — | — | — | — |
| Sodium stearate | — | — | — | 1.00 | 1.00 | 1.00 | 1.00 | 1.00 | 1.00 | 1.00 |
| Tall Oil | 0.60 | 0.60 | 0.60 | — | — | — | — | — | — | — |
| Distilled Water | 40.80 | 41.92 | 51.10 | 60.84 | 60.84 | 60.45 | 61.62 | 61.60 | 56.43 | 53.83 |
| Water as % of Solids | 30.0 | 32.0 | 35.0 | 39.0 | 39.0 | 39.0 | 39.5 | 44.0 | 33.0 | 45.0 |
| $w_{av}$ (CFRM) | 7.4 | 6.2 | 8.1 | 7.2 | 10.5 | 6.8 | 6.8 | 7.6 | 7.3 | 5.4 |
| $w_{av}$ (PF) | 7.7 | 8.2 | 31.0 | 30.6 | 30.6 | 30.6 | 30.6 | 29.0 | 31.7 | 30.0 |

Table 3 lists properties of examples as disclosed herein.

TABLE 3

| Example | A | B | B2 | C | D | E |
|---|---|---|---|---|---|---|
| 750-1000° C. Rate (° C./hr) | 20 | 20 | 20 | 20 | 75 | 75 |
| Tmax (° C.) | 1380 | 1380 | 1380 | 1380 | 1380 | 1380 |
| Duration at Tmax (hrs) | 20 | 20 | 20 | 20 | 20 | 20 |
| Cell Density (in$^{-2}$) | 370 | 370 | 364 | 370 | 330 | 330 |
| Wall Thickness (10$^{-3}$ in) | 10.5 | 10.5 | 7.5 | 10.5 | 13 | 13 |
| Closed Frontal Area | 0.363 | 0.363 | 0.266 | 0.363 | 0.417 | 0.417 |
| Pore Volume (cm$^3$/g) | 0.6842 | 0.6404 | 0.7247 | 0.7764 | 0.5861 | 0.5791 |
| % Porosity | 64.6 | 60.8 | 65.3 | 66.6 | 60.1 | 59.8 |
| $d_1$ | 2.6 | 4.1 | 2.7 | 3.6 | 2.7 | 3.5 |
| $d_2$ | 3.0 | 4.7 | 3.5 | 4.2 | 3.3 | 4.1 |
| $d_5$ | 3.9 | 5.7 | 4.5 | 5.4 | 4.3 | 5.2 |
| $d_{10}$ | 4.6 | 6.6 | 5.4 | 6.8 | 5.3 | 6.3 |
| $d_{25}$ | 6.0 | 8.3 | 6.9 | 9.5 | 7.3 | 8.3 |
| $d_{50}$ | 8.0 | 9.9 | 7.9 | 12.1 | 9.2 | 10.3 |
| $d_{75}$ | 9.5 | 11.2 | 8.8 | 14.4 | 10.7 | 12.4 |
| $d_{90}$ | 12.1 | 15.7 | 11.2 | 18.8 | 13.6 | 16.4 |
| $d_{95}$ | 21.9 | 44.4 | 27.3 | 31.1 | 21.7 | 25.2 |
| $d_{98}$ | 92.1 | 146.4 | 102.1 | 104.5 | 94.6 | 58.4 |
| $d_{99}$ | 166.4 | 202.6 | 177.1 | 180.2 | 171.4 | 104.8 |
| $(d_{50} - d_{10})/d_{50} = d_f$ | 0.43 | 0.33 | 0.31 | 0.44 | 0.42 | 0.39 |
| $(d_{90} - d_{50})/d_{50} = d_c$ | 0.52 | 0.59 | 0.42 | 0.56 | 0.47 | 0.58 |
| $(d_{90} - d_{10})/d_{50} = d_b$ | 0.94 | 0.92 | 0.73 | 0.99 | 0.90 | 0.97 |
| $PCF_b$ = % Porosity/$d_b$ | 68 | 66 | 89 | 67 | 67 | 61 |
| $PCF_f$ = % Porosity/$d_f$ | 151 | 185 | 208 | 153 | 142 | 153 |
| $(d_{50})^2$/(% Porosity/100) (µm$^2$) | 41 | 59 | 41 | 97 | 51 | 64 |
| Permeability (µm$^2$) | 0.85 | 1.53 | — | — | — | — |
| % FE at 0.01 g/l soot loading | 96 | 91 | — | 82 | — | — |
| CTE, 25-800 (10$^{-7}$/° C.) | 13.7 | 16.8 | 16.8 | 16.7 | 16.5 | 16.6 |
| CTE, 200-1000 (10$^{-7}$/° C.) | 17.3 | 21.2 | 21.4 | 20.8 | 21.1 | 21.1 |
| CTE, 500-900 (10$^{-7}$/° C.) | 20.2 | 23.8 | 23.9 | 23.5 | 24.0 | 24.1 |
| Transverse I-ratio | 0.78 | 0.63 | — | 0.68 | 0.74 | 0.76 |
| Axial I-ratio | 0.53 | 0.66 | — | 0.64 | 0.60 | 0.56 |
| % Mullite | 0 | 0 | — | 0 | 0 | 0.6 |
| % Spinel + Sapphirine | 0 | 1.9 | — | 1.0 | 1.5 | 1.1 |
| % Corundum | 0 | 0 | — | 0 | 0 | 0 |
| MOR (psi) | 475 | 640 | 319 | 450 | 949 | 813 |

TABLE 3-continued

| Example | A | B | B2 | C | D | E |
|---|---|---|---|---|---|---|
| MOR/CFA (psi) | 1308 | 1763 | 1201 | 1238 | 2279 | 1952 |
| E at 25° C. ($10^5$ psi) | 2.98 | 2.86 | 1.91 | 2.59 | 6.49 | 5.77 |
| E at 900° C. ($10^5$ psi) | 2.76 | 2.63 | 1.81 | 2.38 | 6.02 | 5.34 |
| E(900° C.)/E(25° C.) | 0.926 | 0.920 | 0.948 | 0.919 | 0.928 | 0.925 |
| Microcrack Index, $Nb^3$ | 0.010 | 0.008 | 0.024 | 0.007 | 0.010 | 0.011 |
| MOR/E (%) | 0.159% | 0.224% | 0.167% | 0.174% | 0.146% | 0.141% |
| TSL(200) (° C.) | 1121 | 1258 | 981 | 1034 | 894 | 869 |
| TSL(500) (° C.) | 1289 | 1441 | 1200 | 1238 | 1109 | 1085 |
| $P_c$ for Cell Geometry listed above | 4.59 | 4.41 | 3.91 | 4.24 | — | — |
| Clean Pressure Drop (kPa) | 1.63 | 1.67 | 1.17 | 1.67 | — | — |
| Pc for 200/8 Cell Geometry | 2.98 | 2.84 | 2.99 | 2.71 | 2.89 | 2.82 |
| MOR (psi) for 200/8 | 279 | 376 | 256 | 264 | 487 | 417 |
| Pc for 200/6 Cell Geometry | 2.55 | 2.45 | — | 2.35 | 2.49 | 2.43 |
| MOR (psi) for 200/6 | 213 | 286 | — | 201 | 370 | 317 |
| Pc for 300/6 Cell Geometry | 3.18 | 3.08 | 3.19 | 2.98 | 3.12 | 3.06 |
| MOR (psi) for 300/6 | 258 | 347 | 237 | 244 | 449 | 385 |
| Pc for 400/4 Cell Geometry | 3.39 | 3.32 | — | — | 3.34 | 3.30 |
| MOR (psi) for 400/4 | 201 | 271 | — | — | 350 | 300 |

Table 4 lists properties of examples as disclosed herein.

TABLE 4

| Example | F | G | H | I | J |
|---|---|---|---|---|---|
| 750-1000oC. Rate (° C./hr) | 75 | 75 | 75 | 75 | 75 |
| Tmax (oC.) | 1400 | 1400 | 1400 | 1340 | 1400 |
| Duration at Tmax (hrs) | 20 | 20 | 20 | 20 | 20 |
| Cell Density (in-2) | 330 | 330 | 330 | 330 | 330 |
| Wall Thickness (10−3 in) | 13 | 13 | 13 | 13 | 13 |
| Closed Frontal Area | 0.417 | 0.417 | 0.417 | 0.417 | 0.417 |
| Pore Volume (cm3/g) | 0.563 | 0.4924 | 0.5889 | 0.6564 | 0.7355 |
| % Porosity | 59.0 | 56.3 | 59.7 | 63.2 | 65.0 |
| d1 | 5.5 | 5.2 | 4.9 | 3.1 | 3.9 |
| d2 | 6.3 | 5.8 | 6.5 | 3.7 | 4.7 |
| d5 | 7.1 | 6.8 | 7.9 | 4.7 | 6.1 |
| d10 | 8.0 | 7.6 | 9.4 | 5.9 | 7.5 |
| d25 | 9.6 | 9.1 | 11.6 | 8.0 | 9.5 |
| d50 | 11.3 | 10.4 | 13.5 | 10.5 | 11.3 |
| d75 | 12.6 | 11.9 | 15.1 | 13.2 | 12.7 |
| d90 | 15.7 | 15.5 | 18.9 | 19.7 | 15.5 |
| d95 | 26.8 | 36.1 | 31.1 | 47.5 | 25.6 |
| d98 | 117.1 | 139.2 | 110.5 | 167.5 | 109.0 |
| d99 | 181.9 | 197.2 | 177.6 | 246.1 | 191.2 |
| (d50 − d10)/d50 = df | 0.29 | 0.27 | 0.29 | 0.44 | 0.34 |
| (d90 − d50)/d50 = dc | 0.39 | 0.49 | 0.39 | 0.88 | 0.37 |
| (d90 − d10)/d50 = db | 0.68 | 0.76 | 0.68 | 1.32 | 0.71 |
| PCFb = % Porosity/db | 86 | 74 | 85 | 48 | 92 |
| PCFf = % Porosity/df | 204 | 206 | 194 | 143 | 193 |
| (d50)2/(% Porosity/100) ($\mu m^2$) | 75 | 61 | 109 | 69 | 83 |
| Permeability ($\mu m^2$) | — | — | — | — | — |
| % FE at 0.01 g/l soot loading | — | — | — | — | — |
| CTE, 25-800 (10−7/° C.) | 20.3 | 18.8 | 14.4 | 17.8 | 12.2 |
| CTE, 200-1000 (10−7/° C.) | 25.1 | 23.3 | 15.4 | 21.5 | 16.7 |
| CTE, 500-900 (10−7/° C.) | 27.2 | 26.1 | 21.5 | 24.7 | 19.4 |
| Transverse I-ratio | 0.64 | 0.71 | 0.76 | 0.66 | 0.82 |
| Axial I-ratio | 0.57 | 0.60 | 0.56 | 0.59 | 0.51 |
| % Mullite | 0 | 0 | 0 | 0 | 0.8 |
| % Spinel + Sapphirine | 0.8 | 0.9 | 2.5 | 3.0 | 1.3 |
| % Corundum | 0 | 0 | 0 | 0 | 0 |
| MOR (psi) | 1189 | 1623 | 1078 | 670 | 813 |
| MOR/CFA (psi) | 2853 | 3896 | 2587 | 1608 | 1952 |
| E at 25° C. ($10^5$ psi) | 5.91 | 8.19 | 5.90 | 5.08 | 4.30 |
| E at 900° C. ($10^5$ psi) | 5.34 | 7.39 | 5.19 | 4.59 | 4.04 |
| E(900° C.)/E(25° C.) | 0.904 | 0.902 | 0.880 | 0.904 | 0.940 |
| Microcrack Index, $Nb^3$ | 0.005 | 0.005 | 0.009 | 0.007 | 0.019 |
| MOR/E (%) | 0.201% | 0.198% | 0.183% | 0.132% | 0.189% |
| TSL(200) (° C.) | 1000 | 1050 | 1195 | 812 | 1332 |
| TSL(500) (° C.) | 1240 | 1259 | 1350 | 1033 | 1475 |
| Pc for Cell Geometry listed above | — | — | — | — | — |
| Clean Pressure Drop (kPa) | — | — | — | — | — |
| Pc for 200/8 Cell Geometry | 2.77 | 2.83 | 2.69 | 2.79 | 2.75 |
| MOR (psi) for 200/8 | 609 | 832 | 552 | 343 | 417 |
| Pc for 200/6 Cell Geometry | 2.39 | 2.44 | 2.33 | 2.41 | 2.38 |
| MOR (psi) for 200/6 | 464 | 633 | 420 | 261 | 317 |
| Pc for 300/6 Cell Geometry | 3.03 | 3.07 | 2.97 | 3.04 | 3.01 |

TABLE 4-continued

| Example | F | G | H | I | J |
|---|---|---|---|---|---|
| MOR (psi) for 300/6 | 562 | 768 | 510 | 317 | 385 |
| Pc for 400/4 Cell Geometry | 3.28 | 3.31 | 3.24 | 3.29 | 3.27 |
| MOR (psi) for 400/4 | 438 | 598 | 397 | 247 | 300 |

Table 5 lists comparative examples and properties.

TABLE 5

| | K | L | M | N | O | P | Q | R |
|---|---|---|---|---|---|---|---|---|
| Cell Density (in$^{-2}$) | 206 | 300 | 203 | 199 | 183 | 192 | 210 | 197 |
| Wall Thickness (10$^{-3}$ in) | 12.2 | 14.5 | 22.0 | 13.4 | 12.7 | 13.8 | 19.4 | 20.6 |
| Closed Frontal Area | 0.320 | 0.439 | 0.529 | 0.342 | 0.314 | 0.346 | 0.483 | 0.494 |
| Pore Volume (ml/g) | 0.3923 | — | — | — | — | — | 0.2721 | — |
| % Porosity | 49.5 | 49.5 | 45.3 | 50.5 | 61.8 | 54.3 | 41.3 | 49.4 |
| $d_1$ | 0.8 | — | — | — | — | — | — | — |
| $d_2$ | 1.2 | — | — | — | — | — | — | — |
| $d_5$ | 2.0 | — | — | — | — | — | — | — |
| $d_{10}$ | 3.1 | 11.3 | 5.9 | 8.7 | 8.7 | 5.1 | 5.0 | 7.6 |
| $d_{25}$ | 7.0 | — | — | — | — | — | — | — |
| $d_{50}$ | 12.7 | 19.2 | 12.4 | 16.4 | 17.2 | 10.4 | 9.7 | 16.3 |
| $d_{75}$ | 18.4 | — | — | — | — | — | — | — |
| $d_{90}$ | 29.2 | 39.1 | 24.8 | 36.3 | 33.1 | 23.5 | 23.6 | 34.8 |
| $d_{95}$ | 44.4 | — | — | — | — | — | — | — |
| $d_{98}$ | 90.4 | — | — | — | — | — | — | — |
| $d_{99}$ | 148.2 | — | — | — | — | — | — | — |
| $(d_{50} - d_{10})/d_{50} = d_f$ | 0.76 | 0.41 | 0.52 | 0.47 | 0.49 | 0.51 | 0.48 | 0.53 |
| $(d_{90} - d_{50})/d_{50} = d_c$ | 1.30 | 1.04 | 1.00 | 1.21 | 0.93 | 1.25 | 1.45 | 1.13 |
| $(d_{90} - d_{10})/d_{50} = d_b$ | 2.05 | 1.45 | 1.52 | 1.68 | 1.42 | 1.76 | 1.93 | 1.66 |
| $PCF_b$ = % Porosity/$d_b$ | 24 | 34 | 30 | 30 | 43 | 31 | 21 | 30 |
| $PCF_f$ = % Porosity/$d_f$ | 65 | 120 | 86 | 108 | 125 | 107 | 86 | 93 |
| $(d_{50})^2/(\%\ Porosity/100)$ | 80 | 182 | 70 | 136 | 182 | 59 | 38 | 131 |
| Permeability (μm$^2$) | — | — | — | — | — | — | — | — |
| % FE at 0.01 g/l soot | 73 | 65 | — | — | — | — | — | — |
| CTE, 25-800 (10$^{-7}$/° C.) | 1.8 | 1.7 | 5.8 | 3.2 | 7.9 | 5.5 | 1.7 | 3.4 |
| CTE, 200-1000 (10$^{-7}$/° C.) | 6.5 | 6.9 | — | — | — | — | — | — |
| CTE, 500-900 (10$^{-7}$/° C.) | 8.9 | 9.4 | — | — | — | — | — | — |
| Transverse I-ratio | 0.87 | — | 0.85 | — | — | 0.92 | 0.86 | 0.86 |
| Axial I-ratio | 0.39 | — | 0.41 | — | — | 0.36 | 0.38 | 0.38 |
| % Mullite | 0 | — | 0 | — | — | 0 | 0 | 0 |
| % Spinel + Sapphirine | 2.4 | — | 3.9 | — | — | 1.9 | 5.2 | 4.4 |
| % Corundum | 0 | — | 0 | — | — | — | — | — |
| MOR (psi) | 336 | 271 | 805 | 425 | 311 | 356 | — | — |
| MOR/CFA (psi) | 1051 | 617 | 1522 | 1243 | 990 | 1028 | — | — |
| E at 25° C. (10$^5$ psi) | 5.62 | 4.93 | — | — | — | — | — | — |
| E at 900° C. (10$^5$ psi) | 7.61 | — | — | — | — | — | — | — |
| E(900° C.)/E(25° C.) | 1.354 | — | — | — | — | — | — | — |
| Microcrack Index, Nb$^3$ | 0.560 | 0.610 | — | — | — | — | — | — |
| MOR/E, % | 0.060% | 0.055% | — | — | — | — | — | — |
| TSL(500) | 1120 | 997 | — | — | — | — | — | — |
| TSL(200) | 1172 | 1085 | — | — | — | — | — | — |
| $P_c$ for Cell Geometry listed above | — | — | 5.48 | 3.58 | 3.31 | 3.94 | 5.58 | 4.83 |
| Clean Pressure Drop (kPa) | — | — | 3.24 | 1.11 | 1.18 | 1.51 | 3.60 | 2.48 |

Figure 4:
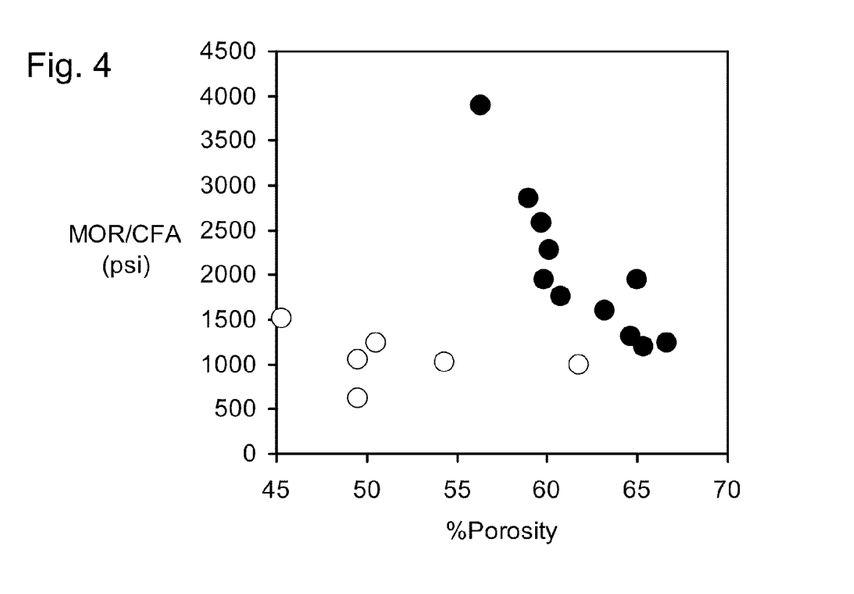
FIG. 4 is a graphic illustration showing the modulus of rupture (MOR) of an axial honeycomb specimen divided by the closed frontal area (CFA) of the honeycomb cross section, which is a measure of the strength of the ceramic wall, plotted against the percent porosity of the filter wall, for examples disclosed herein (filled circles) and comparative known examples (open circles). The data show the high strengths of the examples disclosed herein for a given % porosity.

FIG. 4 is a graphic illustration showing the modulus of rupture (MOR) of an axial honeycomb specimen divided by the closed frontal area (CFA) of the honeycomb cross section, which is a measure of the strength of the ceramic wall, plotted against the percent porosity of the filter wall, for examples disclosed herein (filled circles) and comparative known examples (open circles). The data show the high strengths of the examples disclosed herein for a given % porosity.

Figure 5:
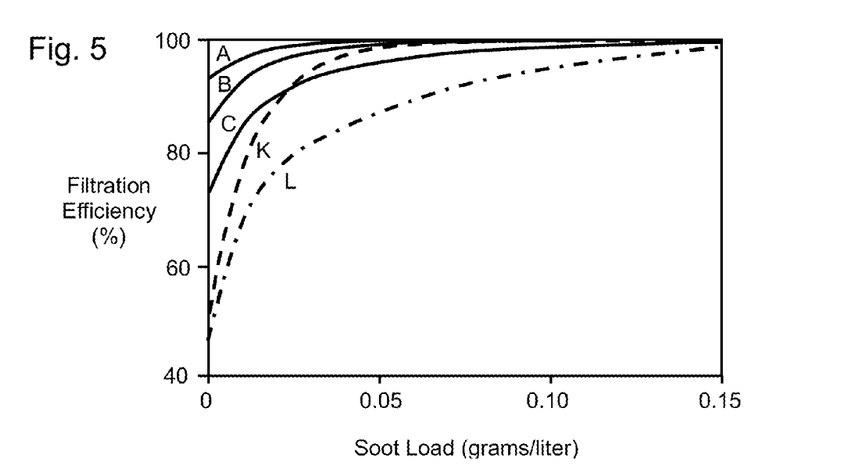
FIG. 5 is a graphic illustration showing the filtration efficiency as a function of soot loading for soot particles having a median particle diameter of 60 nm for examples A, B, and C disclosed herein (solid curves) and for soot particles having a median particle diameter of 113 nm for comparative known examples K and L. The curves show that the examples disclosed herein demonstrate much high filtration efficiency at low soot loadings, even for finer particles, than the comparative known commercial filters.

FIG. 5 is a graphic illustration showing the filtration efficiency as a function of soot loading for soot particles having a median particle diameter of 60 nm for examples A, B, and C disclosed herein (solid curves) and for soot particles having a median particle diameter of 113 nm for comparative known examples K and L. The curves show that the examples disclosed herein demonstrate much high filtration efficiency at low soot loadings, even for finer particles, than the comparative known commercial filters.

Figure 6:
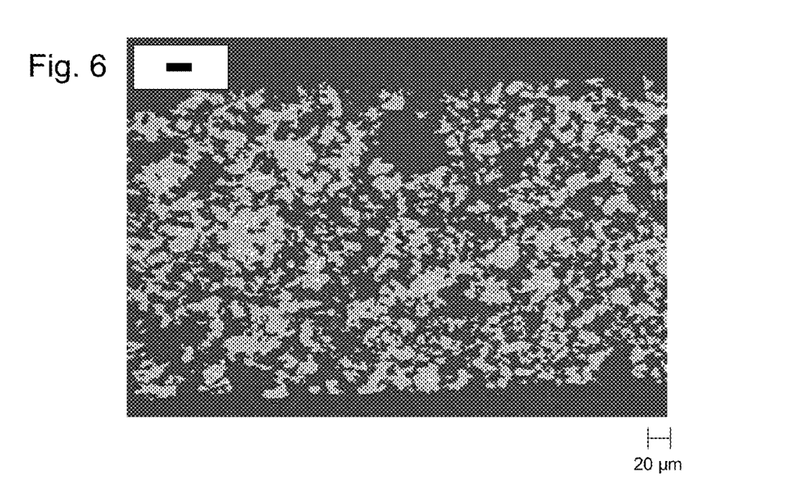
FIG. 6 is a backscattered electron image of a polished cross section the honeycomb wall of example A disclosed herein, showing well interconnected porosity. Scale bar (upper left) is 20 microns.

FIG. 6 is a backscattered electron image of a polished cross section the honeycomb wall of example A disclosed herein, showing well interconnected porosity. Scale bar (upper left) is 20 microns.

Figure 7:
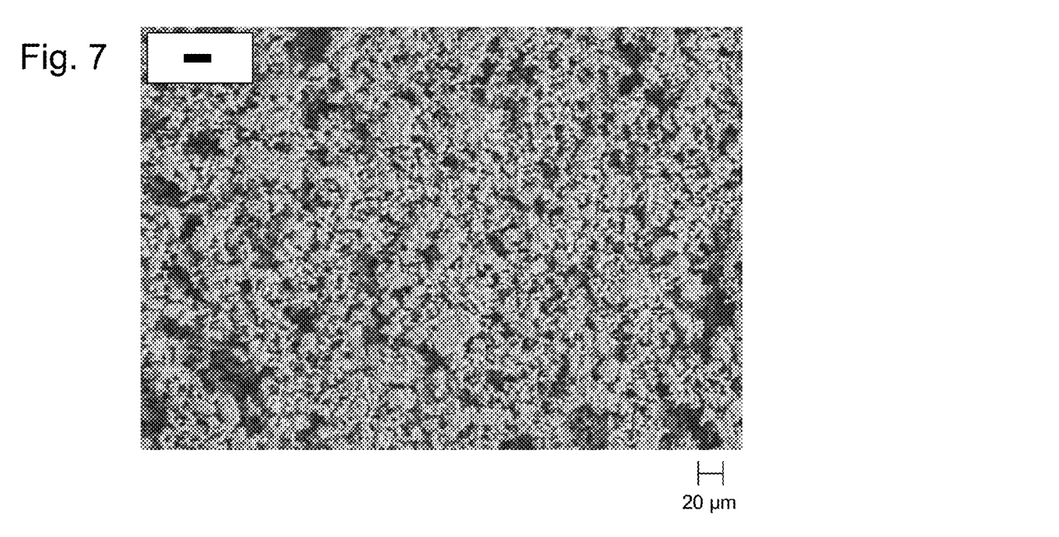
FIG. 7 is a backscattered electron image of the as-fired honeycomb wall surface of example A disclosed herein, showing the high degree of surface porosity which serves to maintain low pressure drop and high filtration efficiency. Scale bar (upper left) is 20 microns.

FIG. 7 is a backscattered electron image of the as-fired honeycomb wall surface of example A disclosed herein, showing the high degree of surface porosity which serves to maintain low pressure drop and high filtration efficiency. Scale bar (upper left) is 20 microns.

Figure 8:
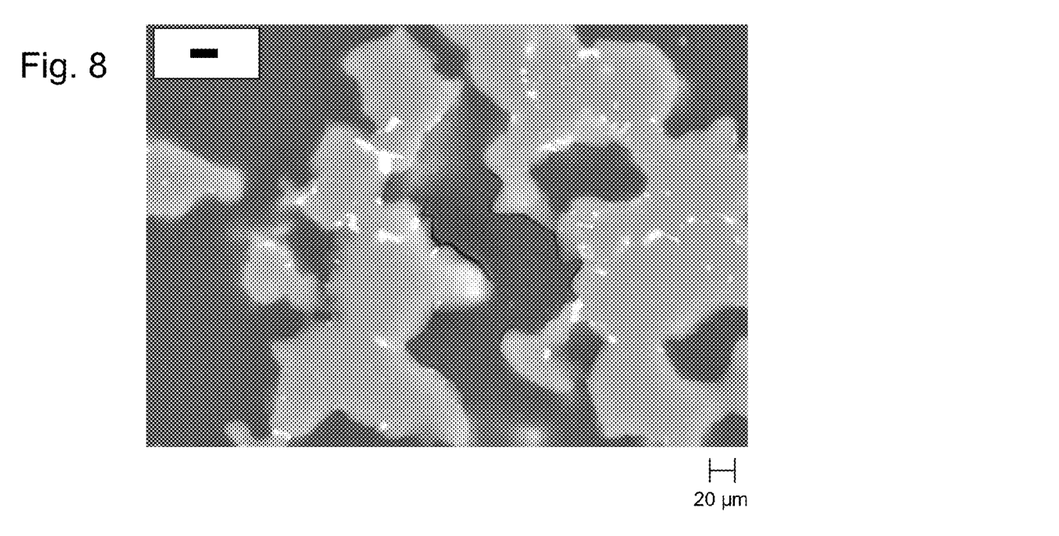
FIG. 8 is a backscattered electron image of a polished cross section the honeycomb wall of example A disclosed herein at higher magnification, showing the presence of an intergranular yttrium-containing glass phase (small white features). Scale bar (upper left) is 2 microns.

FIG. 8 is a backscattered electron image of a polished cross section the honeycomb wall of example A disclosed herein at higher magnification, showing the presence of an intergranular yttrium-containing glass phase (small white features). Scale bar (upper left) is 2 microns.

In one aspect, a particulate filter is disclosed herein comprising a filter body comprised of a honeycomb structure of porous ceramic, the filter body comprising a cell density, N, and a wall thickness, w, the porous ceramic having a total pore volume fraction, p, and a median pore diameter, $d_{50}$, wherein the filter body is characterized by $P_c=0.156(w)+0.00632(N)+2.429(w)/[(d_{50}^2)(p)]$, N is in units of cells (channels) per square inch, w is in units of $10^{-3}$ inches (mils), p is dimensionless and equal to the total porosity in % (% porosity) divided by 100, $d_{50}$ is in units of microns, and $d_{50}$ and % porosity are as measured by mercury porosimetry, and $P_c \leq 4.0$, and wherein the filter body has a $d_{50} \leq 14$ μm, a $d_{90} \leq 20$ μm, a room-temperature four-point modulus of rupture on an axial specimen of the honeycomb structure (MOR) of at least 200 psi, a ratio of MOR/CFA of at least 1100 psi, where CFA is the closed frontal area fraction of the face of the honeycomb substrate, defined as $CFA=(w/1000)[2(N^{-0.5})-(w/1000)](N)$, an elastic modulus ratio, $E(900)/E(25)$, of not more than 0.97, where the value of $E(900)$ is the elastic modulus at 900° C. as measured upon heating, and the value of $E(25)$ is the elastic modulus as measured near room temperature prior to heating, both as measured on a bar parallel to the axial direction of the honeycomb, and a thermal shock limit, $TSL(200)>800°$ C., defined as $TSL(200)=200+(MOR/E)/[CTE(200-1000)]$ where MOR and E are as measured at room temperature and CTE(200-1000) is the mean coefficient of thermal expansion from 200 to 1000° C. as measured by dilatometry along the axial direction of the honeycomb. In some embodiments, $P_c \leq 3.6$; in some of these embodiments $P_c \leq 3.4$. In some embodiments, $CFA \leq 0.23$; in some of these embodiments $CFA \leq 0.21$, and in some of these embodiments $CFA \leq 0.18$. In some embodiments, the % porosity 52%. In some embodiments, $d_{50} \geq 7$ μm; in some of these embodiments, 7 μm $d_{50} \leq 14$ μm; in some of these embodiments 8 μm $d_{50} \leq 12$ μm. In some embodiments, $d_{90} \leq 18$ μm; in some of these embodiments, $d_{90} \leq 16$ μm. In some embodiments, $(d_{50})^2$(% porosity/100)$\geq 30$ μm$^2$; in some of these embodiments, $(d_{50})^2$(% porosity/100)$\geq 50$ μm$^2$; in some of these embodiments, $(d_{50})^2$(% porosity/100)$\geq 70$ μm$^2$; in some of these embodiments, $(d_{50})^2$(% porosity/100)$\geq 90$ μm$^2$. In some embodiments, $d_f=(d_{50}-d_{10})/d_{50}$ and $d_f \leq 0.35$. In some embodiments, $d_b=(d_{90}-d_{10})/d_{50}$ and $d_b \leq 1.00$. In some embodiments, MOR/CFA$\geq 1500$ psi; in some of these embodiments, MOR/CFA$\geq 2000$ psi. In some embodiments, $E(900)/E(25) \leq 0.94$. In some embodiments, the filter body has a microcrack index, $Nb^3 \leq 0.02$.

In some embodiments, MOR(25)/E(25)$\geq 0.140$%; in some of these embodiments, MOR(25)/E(25)$\geq 0.160$%; in some of these embodiments, MOR(25)/E(25)$\geq 0.180$%. In some embodiments, the filter body exhibits a mean CTE from 25 to 800° C. as measured in the axial direction, in units of $10^{-7}/°$C., of 12. In some embodiments, the porous ceramic comprises a primary ceramic phase of cordierite. In some embodiments, TSL(200)$\geq 1000°$ C., $P_c \leq 3.0$, MOR$\geq 250$ psi, and $E(900)/E(25) \leq 0.94$; in some of these embodiments, $d_{90} \leq 16$ μm; in some of these embodiments, TSL(200)$\geq 1100°$ C. In some embodiments, TSL(200)$\geq 1000°$ C., $P_c \leq 3.0$, MOR$\geq 250$ psi, and $Nb^3 \leq 0.020$; in some of these embodiments, $d_{90} \leq 16$ μm'; in some of these embodiments, TSL(200)$\geq 1100°$ C. In some embodiments, TSL(200)$\geq 1150°$ C. and MOR$\geq 300$ psi; in some of these embodiments, $P_c \leq 2.8$.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A particulate filter comprising a filter body comprised of a honeycomb structure of porous ceramic, the filter body comprising a cell density, N, and a wall thickness, w, the porous ceramic having a total pore volume fraction, p, and a median pore diameter, $d_{50}$;
   wherein the filter body is characterized by $P_c=0.156(w)+0.00632(N)+2.429(w)/[(d_{50}^2)(p)]$, N is in units of cells (channels) per square inch, w is in units of $10^{-3}$ inches (mils), p is dimensionless and equal to the total porosity in % (% porosity) divided by 100, $d_{50}$ is in units of microns, and $d_{50}$ and % porosity are as measured by mercury porosimetry, and $P_c \leq 4.0$; and
   wherein the filter body has:
      a $d_{50} \leq 14$ μm,
      a $d_{90} \leq 20$ μm,
      a room-temperature four-point modulus of rupture on an axial specimen of the honeycomb structure (MOR) of at least 200 psi,
      a ratio of MOR/CFA of at least 1100 psi, where CFA is the closed frontal area fraction of the face of the honeycomb substrate, defined as $CFA=(w/1000)[2(N^{-0.5})-(w/1000)](N)$;
      an elastic modulus ratio, $E(900)/E(25)$, of not more than 0.97, where the value of $E(900)$ is the elastic modulus at 900° C. as measured upon heating, and the value of $E(25)$ is the elastic modulus as measured near room temperature prior to heating, both as measured on a bar parallel to the axial direction of the honeycomb, and
      a thermal shock limit, $TSL(200)>800°$ C., defined as $TSL(200)=200+(MOR/E)/[CTE(200-1000)]$ where MOR and E are as measured at room temperature and CTE(200-1000) is the mean coefficient of thermal expansion from 200 to 1000° C. as measured by dilatometry along the axial direction of the honeycomb.

2. The particulate filter of claim 1 wherein $P_c \leq 3.6$.
3. The particulate filter of claim 1 wherein $P_c \leq 3.4$.
4. The particulate filter of claim 1 wherein $CFA \leq 0.23$.
5. The particulate filter of claim 1 wherein % porosity$\geq 52$%.
6. The particulate filter of claim 1 wherein $d_{50} \geq 7$ μm.
7. The particulate filter of claim 1 wherein $d_{90} \leq 18$ μm.
8. The particulate filter of claim 1 wherein $(d_{50})^2$(% porosity/100)$\geq 30$ μm$^2$.
9. The particulate filter of claim 1, wherein the particulate filter has a value $d_f$ of $\leq 0.35$, wherein $d_f=(d_{50}-d_{10})/d_{50}$.
10. The particulate filter of claim 1, wherein the particulate filter has a value $d_b$ of $\leq 1.00$, wherein $d_b=(d_{90}-d_{10})/d_{50}$.
11. The particulate filter of claim 1 wherein MOR/CFA$\geq 1500$ psi.
12. The particulate filter of claim 1 wherein $E(900)/E(25) \leq 0.94$.
13. The particulate filter of claim 1 wherein the filter body has a microcrack index, $Nb^3 \leq 0.02$.
14. The particulate filter of claim 1 wherein MOR(25)/E(25)$\geq 0.140$%.
15. The particulate filter of claim 1 wherein the porous ceramic comprises a primary ceramic phase of cordierite.
16. The particulate filter of claim 1 wherein TSL(200)$\geq 1000°$ C., $P_c \leq 3.0$, MOR$\geq 250$ psi, and $E(900)/E(25) \leq 0.94$.
17. The particulate filter of claim 16 wherein $d_{90} \leq 16$ μm.
18. The particulate filter of claim 16 wherein TSL(200)$\geq 1100°$ C.
19. The particulate filter of claim 1 wherein TSL(200)$\geq 1000°$ C., $P_c \leq 3.0$, MOR$\geq 250$ psi, and $Nb^3 \leq 0.020$.
20. The particulate filter of claim 1 wherein TSL(200)$\geq 1150°$ C. and MOR$\geq 300$ psi.

* * * * *